June 21, 1932.    D. W. RANTINE    1,864,147
VEGETABLE CUTTER
Filed May 12, 1930

INVENTOR
Daniel W. Rantine
BY
Willis and Hastings
ATTORNEYS.

Patented June 21, 1932

1,864,147

UNITED STATES PATENT OFFICE

DANIEL W. RANTINE, OF BROOKLYN, NEW YORK

VEGETABLE CUTTER

Application filed May 12, 1930. Serial No. 451,628.

This invention relates to food cutting devices by which fruits, vegetables, and various other articles may be cut easily and rapidly into different ornamental shapes and sizes, as may be required. Such culinary devices are equally applicable to the cutting of bread, toast and fruits, as watermelons, apples, carrots, potatoes, etc. etc. preparatory to, or completing them for table use.

One object of the present invention is to provide an essentially, simple, efficient and practical device which may be operated successfully without previous experience, and without possible danger to the operator.

A further feature is in the provision of means whereby the food may be cut into parallel slices of uniform thickness, double thickness, and also to produce squares and other geometrical rectangular designs at will.

Another object is to produce a device which is inexpensive to construct, readily amenable to ordinary cleansing operations, and which is not liable to become disordered.

These several important objects are attained by the novel design, construction and combination of parts hereinafter described, and shown in the accompanying drawing, forming a material part of this disclosure, and in which.

Figure 1:
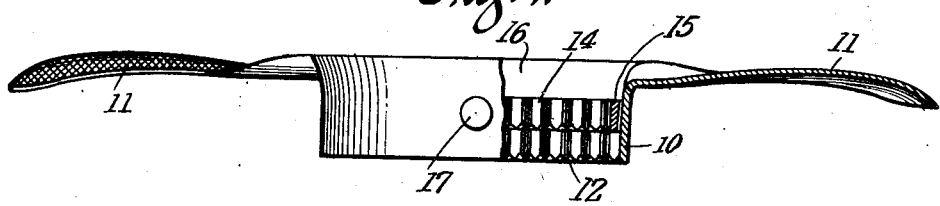
Figure 1 is a side elevational view of an embodiment of the invention, partially in section.
Figure 2:
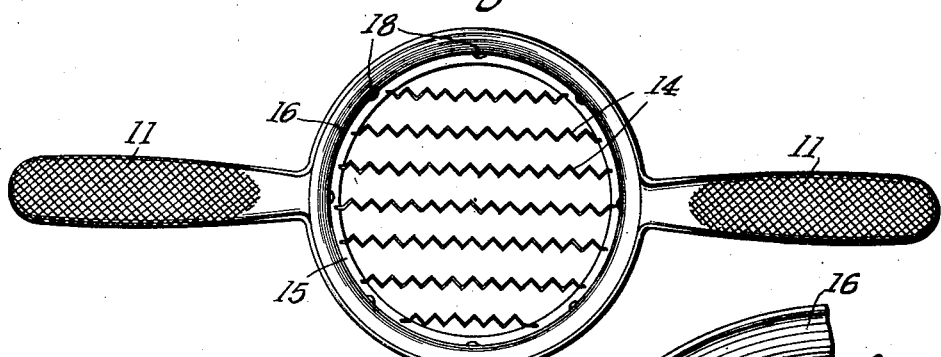
Figure 2 is a top plan view of the same.
Figure 3:
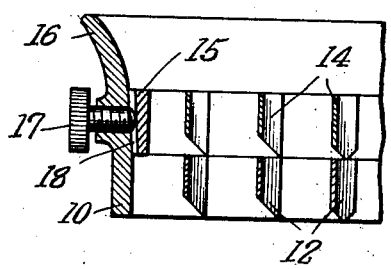
Figure 3 is an enlarged fragmentary sectional view showing the upper and lower series of knives in registered position.
Figure 5:
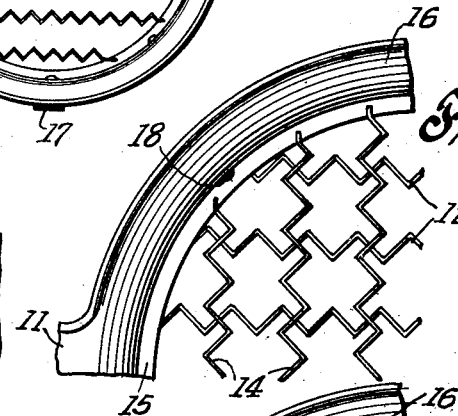
Figure 5 is an enlarged fragmentary plan view of the upper series of knives as disposed at right angles with the lower knives.
Figure 4:
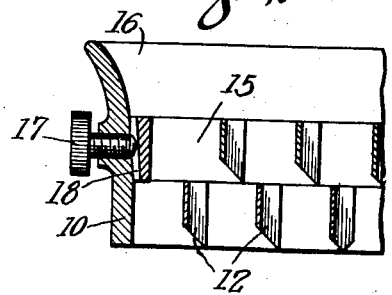
Figure 4 is a similar view but showing the ring carried upper series of knives disposed in planes intermediate the lower, fixed knives.
Figure 6:
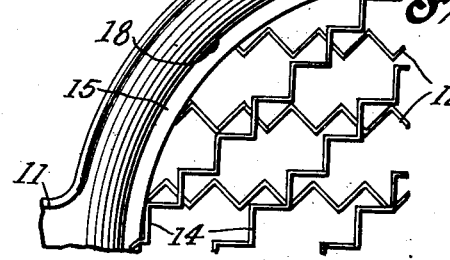
Figure 6 is a similar view showing the upper knives arranged to produce generally elongated rectangular cuttings.

The apparatus consists of a narrow cylindrical housing 10 having handles 11 extending from two of its opposite sides, these handles being firmly and easily grasped in the operation of the apparatus.

Set rigidly in the cylindrical housing 10, in its bottom portion, are a series of knives or cutters 12 which are preferably crimped, crinkled, undulated or provided with transverse angular sinuosities extending throughout their length, so that the food cut may present a tasteful aspect, and also to materially strengthen the blades, which are bevelled from one or both sides to present keen cutting edges, having a series of toothed points resembling those of a saw.

These knives are arranged in uniformly spaced, parallel relation, the series extending preferably in the direction of the handles but are slightly offset relative to one side of the housing for a purpose further on explained.

It is found by experience that the housing with its handles may be preferably cast, of aluminum or like non-tarnishable material, the knife blades being so held in the casting process as to become to all intents and purposes an integral part of the structure, being permanently embedded at their ends in the metal.

A second series of similar knives 14 are secured rigidly in a frame or ring 15 suited to enter the upper outwardly flared portion 16 of the cylinder and held in an adjusted position by one or more thumb screws 17 passing through the housing 10, the points of the screws entering depressions 18 in the ring 15 whereby it is firmly held in its adjustment.

Due to the fact that both series of knives 12 and 14 are offset from the center, the upper or ring carried knives 14 may be arranged to exactly register with the lower, fixed set knives 12 so that the cuttings produced are of a uniform parallel thickness. But by turning the ring 15 one half way around, or through an angle of 180 degrees, the knives in the upper set will occupy positions midway between the knives of the lower set so that the cuttings produced are one half the thickness of the full width cuttings.

It is also possible that by turning the ring quarter way around or through an angle of 90 degrees, the cuttings are produced in uniform rectangles, and it will be obvious that various geometrical shapes may be obtained by rotating the ring in conformity to the shape desired.

The upper portion 16 of the housing is shaped suitably to receive the cut material, acting as a receiving reservoir to contain a very considerable quantity of the product.

Preferably the blades, occupying the central portion of the cylinder or ring, are bevelled on both sides, while the blades at the sides are bevelled only on their outer sides to produce keen edges, thus preventing any tendency to distortion when entering the curved surfaces of the articles to be cut, such tendency being further avoided by reason of the sharp, easily penetrating, saw toothed cutting edges presented to the article.

In operation the material to be cut is placed upon a suitable surface, preferably a rubber mat, whereupon the apparatus is pressed downward by the operator, the cuttings being forced upwardly into the reservoir 16 eventually to be emptied wherever it may be desired.

It will be apparent that when plain parallel cuttings of full width are desired, the ring and knives set therein may be removed as a unit, these knives serving to produce relatively thin slices or such geometrical shapes as may be required.

While the apparatus has been described in the preferred form of its construction and for the work it is adapted to accomplish, it will be understood that minor changes may be made without departing from the tenor and scope of the appended claims.

Having thus described the invention, what is claimed as new and desired to obtain by Letters Patent, is:

1. A food cutter comprising a handled housing and an upper and lower series of knife blades therein, all of said blades being transversely sharply undulated throughout their length, the centrally disposed blades being bevelled to a cutting edge at the center of their width, and the blades at the sides of the housing bevelled to a cutting edge on their outer sides only.

2. A food cutter comprising a handled housing and an upper and lower series of knife blades therein, all of said blades being transversely sharply undulated throughout their length, the centrally disposed blades being bevelled to a cutting edge at the center of their width, and the blades at the sides of the housing bevelled to a cutting edge on their outer sides only, all of said blades being serrated at their cutting edges.

In testimony whereof I affix my signature.

DANIEL WM. RANTINE.